United States Patent
Linke et al.

(10) Patent No.: US 7,037,099 B2
(45) Date of Patent: May 2, 2006

(54) DEVICE FOR BLOW-MOLDING CONTAINERS

(75) Inventors: Michael Linke, Ahrensburg (DE); Hartwig Mueller, Luetjensee (DE); Martin Gerhards, Hamburg (DE); Michael Litzenberg, Geesthacht (DE)

(73) Assignee: SIG Corpoplast GmbH & Co. KG, Hamburg (DE)

( * ) Notice: Subject to any disclaimer, the term of this patent is extended or adjusted under 35 U.S.C. 154(b) by 351 days.

(21) Appl. No.: 10/332,389

(22) PCT Filed: Jul. 6, 2001

(86) PCT No.: PCT/DE01/02395

§ 371 (c)(1),
(2), (4) Date: Aug. 27, 2003

(87) PCT Pub. No.: WO02/04194

PCT Pub. Date: Jan. 17, 2002

(65) Prior Publication Data

US 2004/0052892 A1   Mar. 18, 2004

(30) Foreign Application Priority Data

Jul. 8, 2000 (DE) .................... 100 33 412

(51) Int. Cl.
*B29C 49/64* (2006.01)
(52) U.S. Cl. .............. 425/182; 425/522; 425/526
(58) Field of Classification Search ............ 425/182, 425/195, 522, 525, 526
See application file for complete search history.

(56) References Cited

U.S. PATENT DOCUMENTS

| | | | |
|---|---|---|---|
| 4,839,127 A * | 6/1989 | Ajmera et al. | 264/526 |
| 5,411,699 A | 5/1995 | Collette et al. | 425/522 |
| 5,560,939 A | 10/1996 | Nakagawa et al. | 425/195 |
| 5,762,981 A | 6/1998 | Nitsche | 425/526 |

FOREIGN PATENT DOCUMENTS

| | | |
|---|---|---|
| DE | 20 37 365 B2 | 1/1972 |
| DE | 23 52 926 A1 | 4/1975 |
| DE | 42 12 583 A1 | 10/1993 |
| DE | 43 40 291 A1 | 6/1995 |
| DE | 199 09 644 A1 | 9/2000 |
| DE | 199 25 756 A1 | 12/2000 |
| DE | 199 34 320 A1 | 1/2001 |
| FR | 2 720 680 | 12/1995 |
| WO | WO 97/07965 | 3/1997 |

* cited by examiner

Primary Examiner—Robert B. Davis
(74) Attorney, Agent, or Firm—Harness, Dickey & Pierce, P.L.C.

(57) ABSTRACT

The device serves for the blow molding of containers that comprise a thermoplastic material, wherein the device has at least one blowing station with at least one blow mold. The blow mold is formed from at least two blow mold segments that are supported by supports, wherein the blow mold has a base extension. The base extension is arranged in such a way that it is capable of being positioned in the direction of a longitudinal axis of the blow mold, and is supported by a base plate. The base plate connects the base extension to a positioning device. The base plate is additionally connected to the base extension by a profiled coupling section, wherein this profiled coupling section is formed from a coupling element, which is connected to the base plate, along with a counter element that is connected to the base extension. The profiled coupling section is capable of being actuated via a manual lever. At least two hollow coupling plugs are arranged a certain distance from the profiled coupling section, wherein these coupling plugs are capable of being introduced into self-sealing coupling sockets.

21 Claims, 6 Drawing Sheets

DEVICE FOR BLOW-MOLDING CONTAINERS

This application is the national phase under 35 U.S.C. § 371 of PCT International Application No. PCT/DE01/02395 which has an International filing date of Jul. 6, 2001, which designated the United States of America and which claims priority on German Patent Application number DE 100 33 412.1 filed Jul. 8, 2000, the entire contents of which are hereby incorporated herein by reference.

FIELD OF THE INVENTION

The invention generally pertains to a device for the blow molding of containers. Preferably, it pertains to one that includes a thermoplastic material, wherein the device has at least one blowing station with at least one blow mold, which is formed from at least two blow mold segments that are supported by supports. More preferably, the blow mold has a base extension that is arranged in such a way that it is capable of being positioned in the direction of a longitudinal axis of the blow mold, and even more preferably, the base extension is supported by a base plate that connects the base extension to a positioning device.

BACKGROUND OF THE INVENTION

In a container molding process affected via the action of pressure due to blowing, the pre-molded elements comprised of a thermoplastic material, e.g. pre-molded elements comprised of PET (Poly(ethylene terephthalate)), are forwarded to various processing stations inside a blowing machine. Typically, such a blowing machine has a heating device as well as a blowing device, whereby the pre-molded element, which has been regulated thermostatically beforehand, is expanded, by means of biaxial orientation, to produce a container in the region of the blowing device. Expansion takes place with the help of compressed air that is introduced into the pre-molded element that is to be expanded. The technical process in the case of such an expansion of the pre-molded element is explained in DE-OS 43 40 291.

The basic structure of a blowing station for use in molding containers is described in DE-OS 42 12 583. Possibilities for thermostatically regulating the pre-molded elements are explained in DE-OS 23 52 926.

The pre-molded elements and the blown containers can be transported within the blow-molding device by use of various handling devices. The use of transportation mandrels, on which the pre-molded elements are positioned, has proven especially valuable in practice. However, the pre-molded elements can also be handled by use of other supporting devices. Available constructions also include the use of grappling tongs for handling the pre-molded elements, and the use of expansion mandrels, which can be introduced into an opening region of the pre-molded element for supporting purposes.

The handling of the pre-molded elements explained above is effected, on the one hand, using the so-called two-stage process, in which the pre-molded elements are first manufactured in an injection molding process, and then are stored on an interim basis; it is only later that they are conditioned, in terms of their thermostatically regulated temperature, and inflated to produce a container. On the other hand, use is also made of the so-called one-stage process, in which the pre-molded elements are suitably thermostatically regulated immediately following their manufacture, by means of injection molding technology, and adequate solidification, after which they are inflated.

Various embodiments of blowing stations that are used are known. In the case of blowing stations that are arranged on rotating transport wheels, the ability of the mold supports to be opened on a hinge in a book-like manner is frequently encountered. However, it is also possible to use mold supports that can be moved relative to one another, or that are guided in a different manner. In the case of spatially fixed blowing stations, which are especially well suited for housing several cavities for container molding purposes, plates, which are typically arranged parallel to one another, are used as mold supports.

In addition to the two blow mold segments, a conventional blow mold includes a base extension that is capable of being positioned. Such a base extension is required when undercuts occur in a horizontal direction in the base region of the container that is to be manufactured. After the container has been molded, the base extension is raised, and the two blow mold segments are separated from one another in order to allow the blown container to be extracted from the blowing station. The base extension is usually screw-fitted to a base plate. In addition, screw connections are provided in order connect cooling water channels inside the base extension to suitable supply lines.

In the event of a product change, it is necessary to change both the blow mold segments and the base extension in order to generate the container contours for the new product. The corresponding change of the base extension is relatively labor intensive because of the screw fitting that is provided for the base extension and the base plate, along with the screw fittings for the connections for the cooling medium.

SUMMARY OF THE INVENTION

An object of an embodiment of the present invention includes constructing a device, such that changing the base extension can take place at reduced operational expense.

In accordance with an embodiment of the invention, this object may be attained by connecting the base plate to the base extension by a profiled coupling section—wherein this profiled coupling section is formed from a coupling element, which is connected to the base plate, along with a counter element, which is connected to the base extension, and wherein the profiled coupling section is capable of being actuated via a manual lever; and by arranging at least two hollow coupling plugs at a certain distance from the profiled coupling section, wherein these coupling plugs are capable of being inserted into self-sealing coupling sockets.

By using the profiled coupling section, which includes the coupling element and the counter element, it is possible to create or, respectively, to abolish a mechanical connection between the base plate and the base extension at low operational expense and with very little consumption of time. Along with the creation of the coupling connection, the use of the coupling plugs and coupling sockets also creates the required connections for the supply and draining off of the cooling water in one operational step.

The manual lever permits the coupling operation to be actuated using very little force. When plugging the coupling element and the counter element together, the coupling plugs are also simultaneously inserted into the associated coupling sockets. The actual arrestment or, respectively, the release from arrestment in the case of the converse operating sequence, is effected by shifting the manual lever.

A compact coupling device may be provided by designing the coupling element such that it can expand.

An especially reliable and low-wear coupling can be provided if the coupling element has at least one oblique flank that positions at least one ball transversely to a longitudinal axis.

Smoothness of the coupling operation, which assists manual actuation, can also be achieved by forming the coupling element, in essence, from a basic element and a guide that supports the basic-element movably in the direction of the longitudinal axis, and by arranging for the guide to have at least one recess in it, which is oriented obliquely to the longitudinal axis, to allow mounting of at least one ball.

In order to ensure the defined allocation of coupling plugs to coupling sockets, it is proposed that the base plate should have at least one rotation safeguarding device for positioning definition relative to the base extension.

The rotation safeguarding device can be produced, for example, by configuring the rotation safeguarding device in the form of a projecting profiled section that is capable of being inserted into a profiled counter-section.

The provision of a rotation safeguarding device without additional components is possible by forming the rotation safeguarding device via an asymmetrical arrangement of the coupling plugs.

Typical utilization entails configuring the coupling plugs in the form of the components of a water coupling unit.

In order to ensure freedom from play, it is proposed that at least one pre-tensioning element be arranged a certain distance from the profiled coupling section.

High security against tipping over can be achieved by arranging at least three pre-tensioning elements a certain distance from the profiled coupling section.

Another feature that contributes to ensuring security against tipping over is that the pre-tensioning elements are arranged at a small distance from the periphery of the base plate.

BRIEF DESCRIPTION OF THE DRAWINGS

Examples of embodiments of the invention are illustrated schematically in the drawings. The following aspects are shown.

DETAILED DESCRIPTION OF THE PREFERRED EMBODIMENTS

Figure 1:
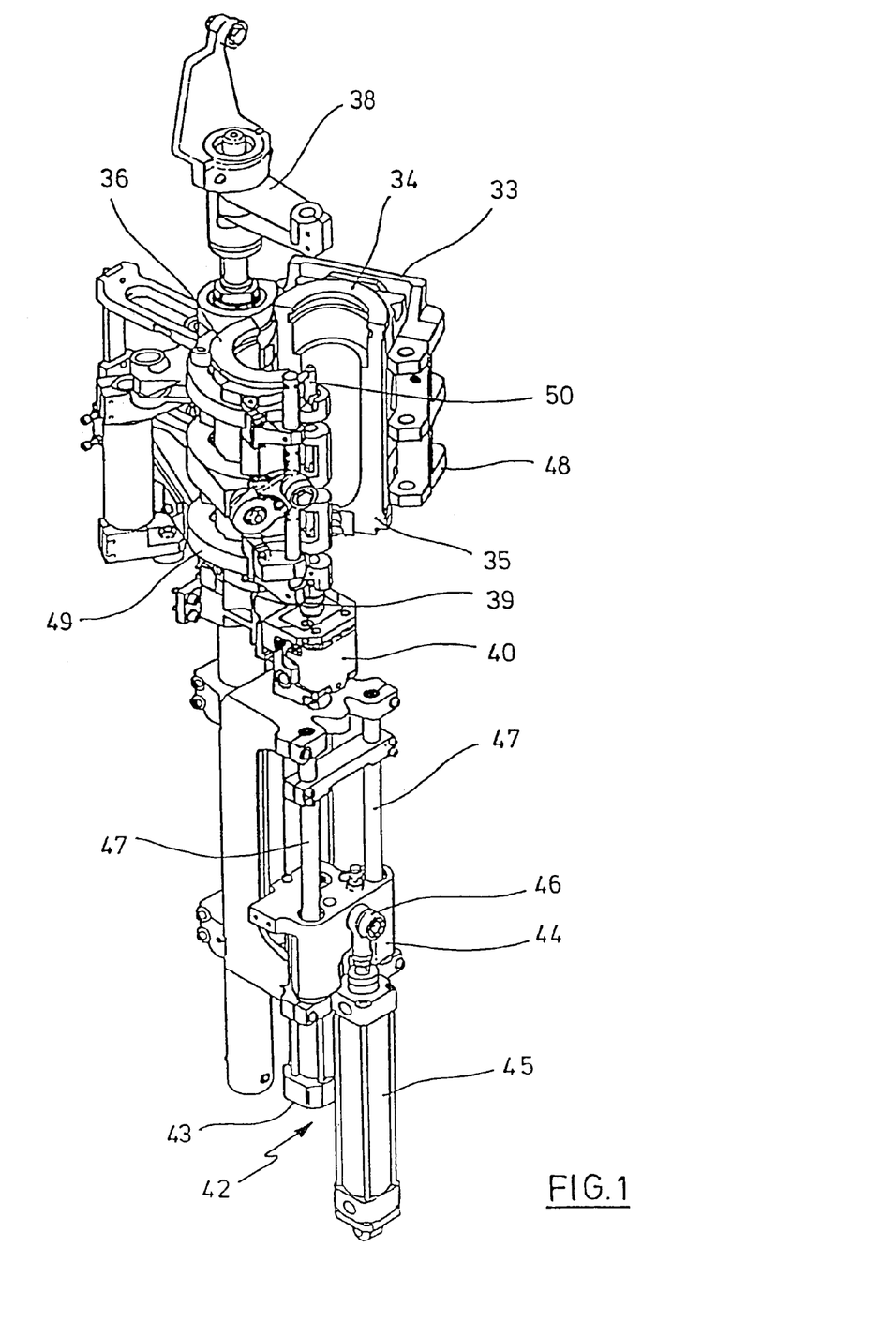
FIG. 1: shows a perspective illustration of a blowing station for the manufacture of containers from pre-molded elements.
Figure 2:
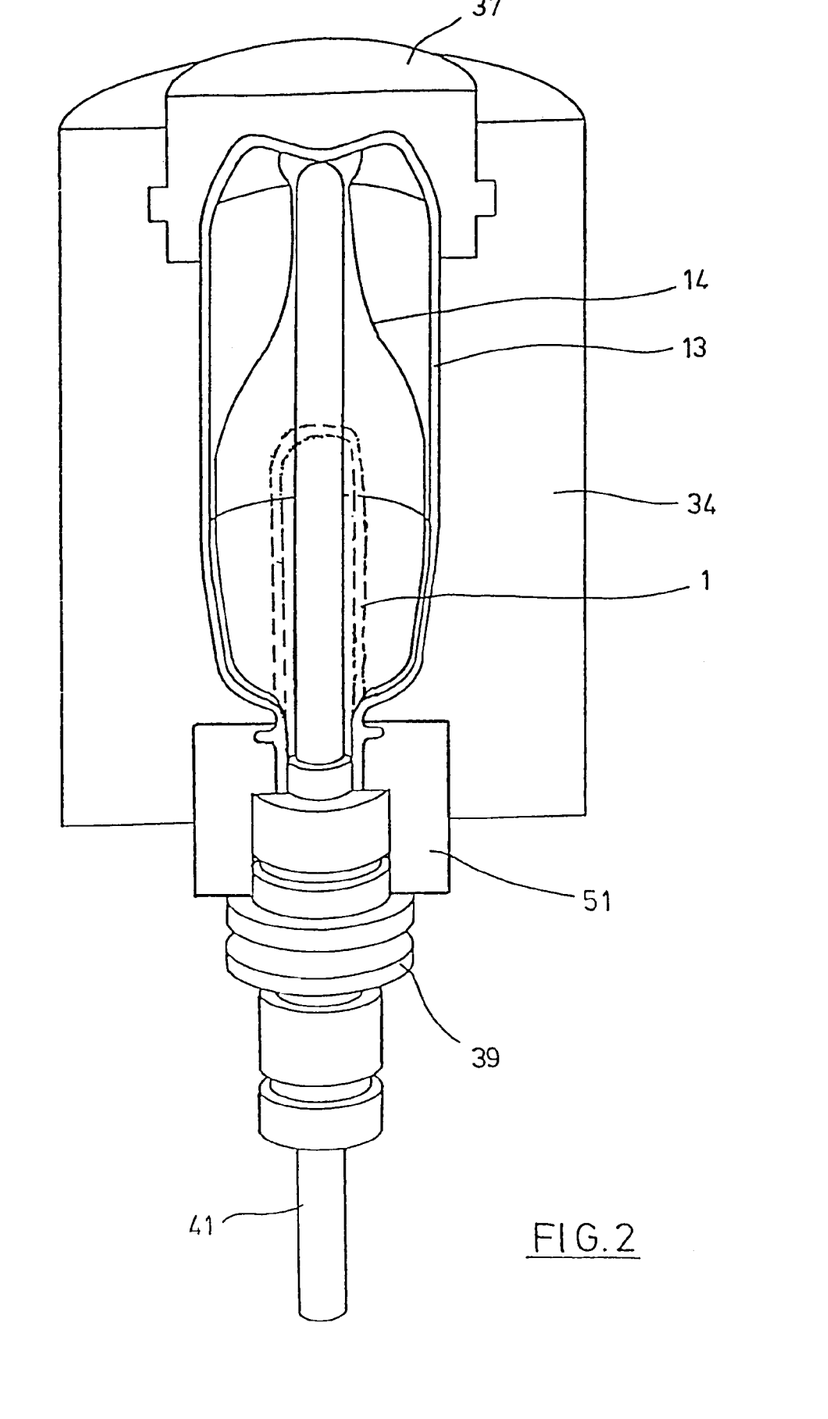
FIG. 2: shows a longitudinal section through a blow mold in which a pre-molded element is being stretched and expanded.

The basic structure of a device for the reshaping of pre-molded elements (1) into containers (13) is illustrated in FIG. 1 and FIG. 2.

The device for molding the container (13) includes, in essence, a blowing station (33), which is provided with a blow mold (34), into which a pre-molded element (1) is capable of being inserted. The pre-molded element (1) can be an injection molded component including poly(ethylene terephthalate). In order to permit the insertion of the pre-molded element (1) into the blow mold (34), and in order to permit the removal of the finished container, the blow mold (34) includes blow mold segments (35, 36) and a base extension (37) that is capable of being positioned by a lifting device (38). The pre-molded element (1) can be supported by a transport mandrel (39) in the region of the blowing station (33), wherein the transport mandrel, along with the pre-molded element (1), passes through a plurality of treatment stations inside the device. However, it is also possible to insert the pre-molded element (1) directly into the blow mold (34) by use of e.g. tongs or other handling implements.

In order to permit the admission of compressed air, a connecting piston (40) is arranged below the transport mandrel (39), wherein the connecting piston supplies compressed air to the pre-molded element (1) and simultaneously provides sealing off relative to the transport mandrel (39). In the case of a modified construction, however, it is also basically conceivable that fixed compressed air supply lines may be used.

Stretching of the pre-molded element (1) takes place with the help of a stretching rod (41) that is positioned by use of a cylinder (42). However, it is also basically conceivable to carry out mechanical positioning of the stretching rod (41) by use of curved segments that are impacted by sensing rollers. The use of curved segments is especially expedient when a plurality of blowing stations (33) are arranged on a rotating blowing wheel. The use of cylinders (42) is expedient when blowing stations (33) that are arranged in a spatially fixed manner are provided.

In the case of the form of embodiment that is illustrated in FIG. 1, the stretching system is formed in such a way that a tandem arrangement of two cylinders (42) is provided. Prior to the start of the actual stretching process, a primary cylinder (43) initially drives the stretching rod (41) into the region of the base (7) of the pre-molded element (1). During the actual stretching process, a secondary cylinder (45) or a curved steering system positions the primary cylinder (43) with the stretching rod, which has been driven out, along with a carriage (44) that supports the primary cylinder (43). In particular, thought has been devoted to making use of the secondary cylinder (45) in a curved steered manner, such that an updated stretching position is created by a guide roller (46) that glides along a curved path during the implementation of the stretching process. The guide roller (46) is pressed against the guide track by the secondary cylinder (45). The carriage (44) glides along two guide elements (47).

Following the closure of the blow mold segments (35, 36), which are arranged in the region of the supports (48, 49), locking of the supports (48) relative to one another takes place with the help of a locking device (50).

In accordance with FIG. 2, the use of separate screw-threaded inserts (51) is provided in the region of the blow mold (34) in order to undertake adaptation to the different shapes of the opening section (2).

In addition to the blown container (13), FIG. 2 also shows the pre-molded element (1), which is drawn in dashed lines, together with a developing container bubble (14) in schematic form.

Figure 3:
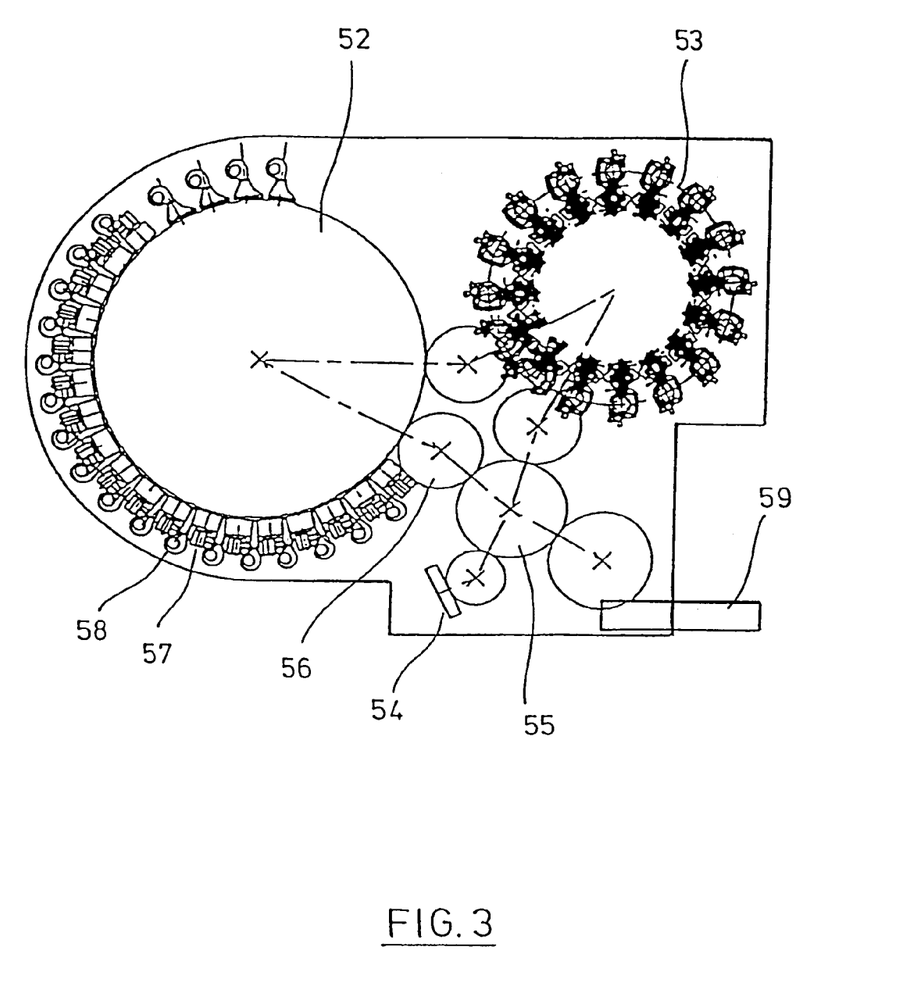
FIG. 3: shows a sketch illustrating a basic structure for a device for the blow molding of containers.

FIG. 3 shows the basic structure of a blowing machine that is provided with a rotating heating wheel (52) as well as a rotating blowing wheel (53). Starting from the input unit (54) for the introduction of the pre-molded elements, the pre-molded elements (1) are transported into the region of the heating wheel by means of transfer wheels (55, 56). Radiant heaters (57) and blowers (58) are arranged along the heating wheel (52) in order to thermostatically regulate the pre-molded elements (1). After adequate thermostatic regulation of the pre-molded elements (1), these are transferred to the blowing wheel (53), wherein blowing stations (33) have been arranged in the region of this blowing wheel. The finished, blown containers (13) are fed to an output section (59) by means of additional transfer wheels.

In order to be able to re-shape a pre-molded element (1) into a container (13) in such a way that the container (13) will have material properties that ensure the long usability of foodstuffs, especially beverages, that are introduced into the interior of the container (13), specific procedural steps must be adhered to during the heating and orientation of the pre-molded elements (1). In addition, advantageous effects can be achieved by adhering to specific procedures with regard to dimensions.

Various synthetic materials can be used as the thermoplastic material, e.g. PET, PEN, or PP.

The expansion of the pre-molded element (1) during the orientation process takes place by admitting compressed air. The compressed air feed is subdivided into a pre-blowing phase, in which gas, e.g. compressed air, is supplied at a low level of pressure, and a subsequent main blowing phase in which gas is supplied at a higher level of pressure. Compressed air at a pressure of between 10 bar and 25 bar is typically used during the pre-blowing phase, and compressed air at a pressure of between 25 bar and 40 bar is fed in during the main blowing phase.

Figure 4:
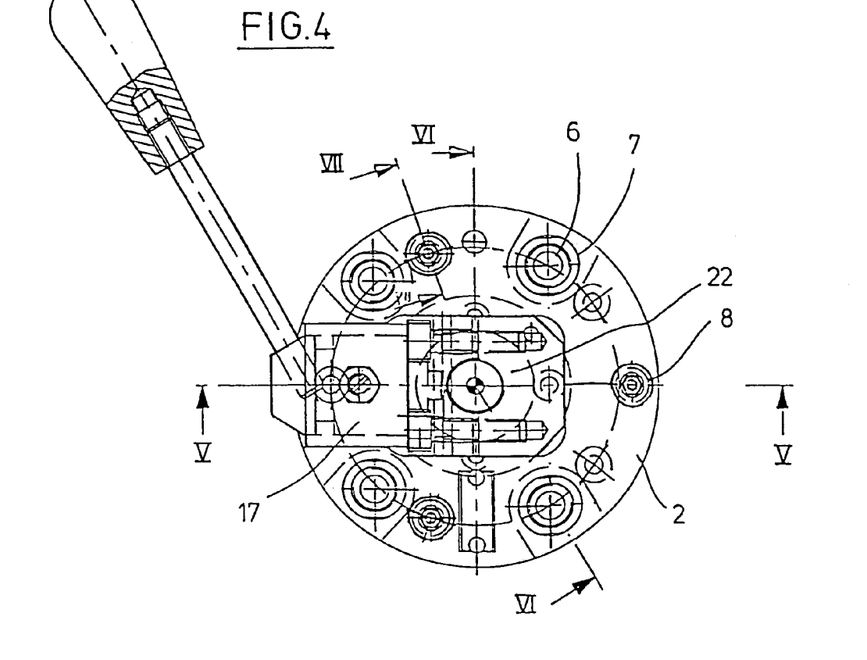
FIG. 4: shows a plan view onto a base plate with a manual lever.

FIG. 4 shows a plan view onto a base plate (2) with a manual lever (3) that has been provided for connecting the base extension (37) to the lifting device (38). The base plate (2) is equipped with a coupling element (4) in order to connect the base plate (2) to the base extension (37), wherein this coupling element engages with a counter element (5) on the base extension (37). The coupling element (4) and the counter element (5) jointly form a profiled coupling section (22).

In the case of the form of embodiment that is illustrated, the base extension (37) is provided with hollow coupling plugs (6) that engage with self-sealing sockets (7) on the base plate (2). The coupling plugs (6) and the sockets (7) serve for supplying a thermostatic regulating medium to the region of the base extension (37), and for draining it off again. In particular, thought has been devoted to the aspect of arranging the coupling plugs (6) asymmetrically in order to provide base mold orientation. It is also fundamentally conceivable for the coupling plugs (6) to be positioned in the region of the base plate (2), and for the sockets (7) to be positioned in the region of the base extension (37).

FIG. 4 also shows the arrangement of pre-tensioning elements (8) that ensure freedom from play in the arrested state of the base extension (7). The pre-tensioning elements (8) can, for example, be configured in the form of disk springs, compression springs, or spiral springs.

Figure 5:
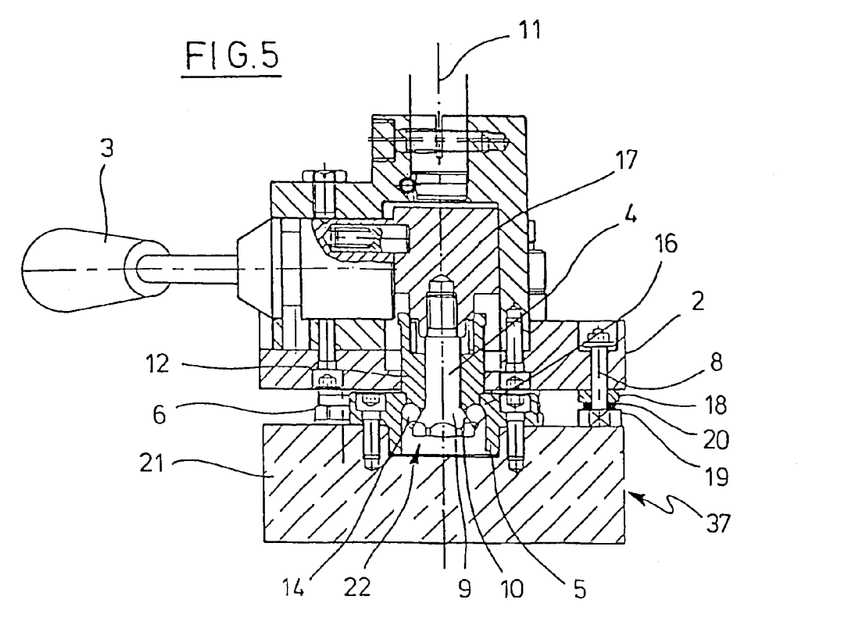
FIG. 5: shows a cross section in accordance with the line V—V in FIG. 4.

It can be seen from the cross sectional illustration in FIG. 5 that, in the case of the embodiment form that is illustrated, the coupling element (4) has a base element (9) that is provided with oblique flanks (10) in the region of its extension that can be introduced into the counter element (5). The base element (9) is mounted movably in a guide (12) in the direction of a longitudinal axis (11), and the oblique flanks (10) act collaboratively with balls (14) that are mounted in obliquely arranged guide recesses (15) in the base element (9). In the event of displacing the base element (9) into the guide (12), the balls (14) are pressed outward transversely to the longitudinal axis (11) as a result of the collaborative action of the oblique flanks (10), the balls (14), and the guide recesses (15), and these balls engage from behind with a collar (16) on the counter element (5). As a result, a positive interlocking connection is provided between the base plate (2) and the base extension (37).

The movement of the base element (9) in the direction of the longitudinal axis (11) is produced via rotary movement of the manual lever (3), wherein the rotary movement of the manual lever (3) is transferred to the base elements (9) by a redirecting unit (17).

As an alternative to generating the coupling element (4) by using the oblique flanks (10) and the balls (14), it is also possible, for example, to provide the supporting plate (21) or, as the case may be, the base extension (37) with a connecting column which projects into the base plate (2) and which is provided with at least one undercut in the direction of its longitudinal axis. The undercut can, for example, be produced in the form of a lateral groove or by countersinking. In accordance with such an embodiment, the feature is provided when actuating the manual lever (3) that a locking element is positioned essentially in the horizontal direction and, in the locked state, it engages with the profiled part of the connecting column and leads to a positive interlocking connection between the base plate (2) and the supporting plate (21) or, as the case may be, the base extension (37). In the case of this embodiment, adequate freedom from play is also ensured by pre-tensioning elements (8). The arresting element can be configured, for example, in the form of a bolt segment. However, both the shaping of the undercut section of the connecting column and the configuration of the arresting element are capable of being varied in many ways. One merely has to ensure adequate adaptation of the respective shape configurations to one another.

It can also be seen from FIG. 5 that, in the case of this embodiment, the pre-tensioning elements (8) are essentially configured in a bolt-like form, and have spring elements (20) between contact-pressure flanks (18, 19), wherein these spring elements are compressed when linking together the base plate (2) and the base extension (37). It can also be seen that the base extension (37) has a supporting plate (21) that supports the base mold that is used for providing the container (13) with its contours, although this base mold is not shown in the illustration depicted.

Figure 6:
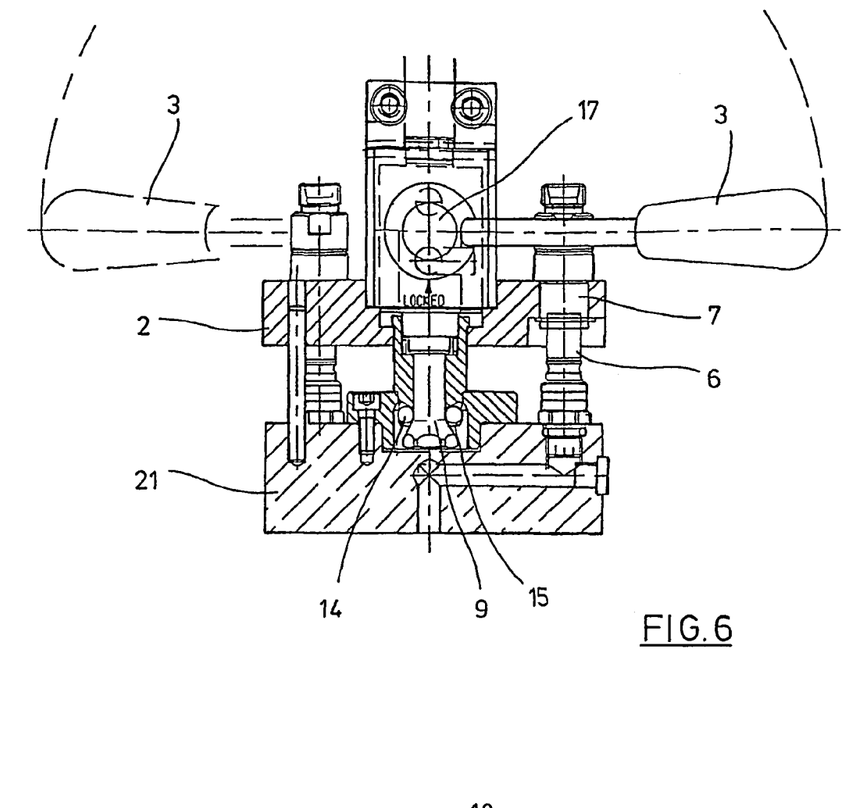
FIG. 6: shows a cross section in accordance with the line VI—VI in FIG. 4.

FIG. 6 shows the manual lever (3) in fully drawn lines when in the releasing position, and in dashed lines when in the arresting position that corresponds to FIG. 5. It can be seen from FIG. 6 that the base element (9) has been pushed out of the guide (12) and that, as a result, the balls (14) have been able to advance sufficiently deeply into the guide recesses (15) that an undercut is no longer present at the collar (16). In this position, it has been possible to remove the base extension (37) from the base plate (2).

Figure 7:
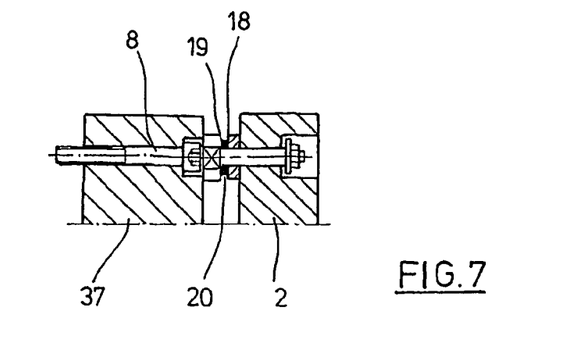
FIG. 7: shows a rotated cross section in accordance with the section line VII—VII in FIG. 4.

FIG. 7 shows the collaboration of the contact-pressure flanks (18, 19), the pre-tensioning elements (8), and the associated spring elements (20), in the form of an enlarged and rotated illustration.

Figure 8:
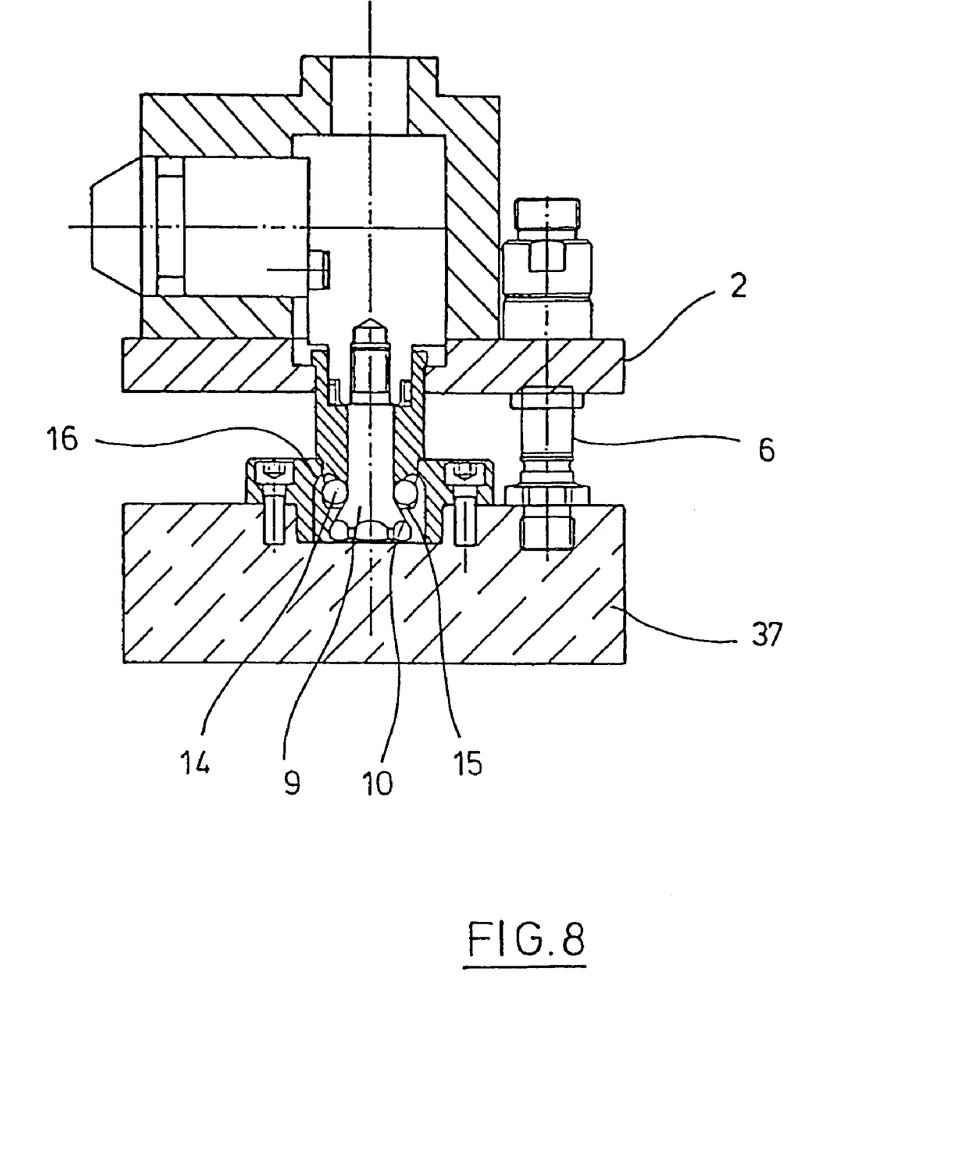
FIG. 8: shows an enlarged illustration, in schematic form, depicting the engagement of the coupling element with the counter element.

FIG. 8 once again illustrates the positioning of the base element (9) relative to the guide (12) in the state in which the base extension (37) can be removed from the base plate (2).

In order to provide additional safeguarding against tipping over, the pre-tensioning elements (8) are preferably arranged at only a small distance from the outer periphery of the base plate (2) or, as the case may be, the base extension (37). The term small distance is hereby understood to mean that the distance of the pre-tensioning elements (8) from the outer periphery of the base plate (2) is less than the distance from the profiled coupling section (22). The use of the three pre-tensioning elements (8) that have been depicted in the exemplary embodiments also contributes to enhanced safeguarding against tipping over.

As an alternative to the use of separate spring elements (20) in the case of the pre-tensioning elements (8) that are illustrated in FIG. 5, it is also possible to arrange springs in the region of the coupling plug (6) or in the region of the coupling sockets (7), and to utilize these for building up the pre-tension.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A device for the blow molding of containers that include a thermoplastic material, comprising:
    at least one blowing station with at least one blow mold, formed from at least two blow mold segments supported by supports, wherein the blow mold includes a base extension arranged such that it is capable of being positioned in the direction of a longitudinal axis of the blow mold, and wherein the base extension is supported by a base plate that connects the base extension to a positioning device, wherein the base plate is connected to the base extension by a profiled coupling section, wherein the profiled coupling section is formed from a coupling element connected to the base plate, along with a counter element connected to the base extension, wherein the profiled coupling section is actuatable via a manual lever, and wherein at least two hollow coupling plugs are arranged a certain distance from the profiled coupling section, the coupling plugs being insertable into self-sealing coupling sockets.

2. The device of claim 1, wherein the coupling element is formed such that it can be expanded.

3. The device of claim 1, wherein the coupling element includes at least one oblique flank that positions at least one ball transversely to a longitudinal axis.

4. The device of claim 1, wherein the coupling element is formed, in essence, from a basic element and a guide, which movably supports the basic element in the direction of the longitudinal axis, and wherein the guide includes at least one recess, oriented obliquely to the longitudinal axis, in order to mount at least one ball.

5. The device of claim 1, wherein the base plate includes at least one rotation-safeguarding device for defining positioning relative to the base extension.

6. The device of claim 5, wherein the rotation-safeguarding device is configured in the form of a projecting profiled section that is capable of being inserted into a profiled counter-section.

7. The device of claim 5, wherein a base mold orientation is created from an asymmetrical arrangement of the coupling plugs.

8. The device of claim 1, wherein the coupling plugs are configured in the form of the components of a water coupling unit.

9. The device of claim 1, wherein at least one pre-tensioning element is arranged a certain distance from the profiled coupling section.

10. The device of claim 9, wherein at least three pre-tensioning elements are arranged a certain distance from the profiled coupling section.

11. The device of claim 9, wherein the pre-tensioning elements are arranged a small distance from the periphery of the base plate.

12. The device of claim 2, wherein the coupling element includes at least one oblique flank that positions at least one ball transversely to a longitudinal axis.

13. The device of claim 2, wherein the coupling element is formed, in essence, from a basic element and a guide, which movably supports the basic element in the direction of the longitudinal axis, and wherein the guide includes at least one recess, oriented obliquely to the longitudinal axis, in order to mount at least one ball.

14. The device of claim 3, wherein the coupling element is formed, in essence, from a basic element and a guide, which movably supports the basic element in the direction of the longitudinal axis, and wherein the guide includes at least one recess, oriented obliquely to the longitudinal axis, in order to mount at least one ball.

15. The device of claim 2, wherein the base plate includes at least one rotation-safeguarding device for defining positioning relative to the base extension.

16. The device of claim 3, wherein the base plate includes at least one rotation-safeguarding device for defining positioning relative to the base extension.

17. The device of claim 2, wherein the coupling plugs are configured in the form of the components of a water coupling unit.

18. The device of claim 3, wherein the coupling plugs are configured in the form of the components of a water coupling unit.

19. The device of claim 2, wherein at least one pre-tensioning element is arranged a certain distance from the profiled coupling section.

20. The device of claim 3, wherein at least one pre-tensioning element is arranged a certain distance from the profiled coupling section.

21. The device of claim 10, wherein the pre-tensioning elements are arranged a small distance from the periphery of the base plate.

* * * * *